United States Patent
Biggs et al.

(10) Patent No.: US 11,042,188 B2
(45) Date of Patent: Jun. 22, 2021

(54) CABLE CONNECTIONS FOR COMPUTING DEVICES BACKGROUND

(71) Applicant: Hewlett-Packard Development Company, L.P., Houston, TX (US)

(72) Inventors: Kent E Biggs, Houston, TX (US); Alexander Wayne Clark, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 346 days.

(21) Appl. No.: 16/089,827

(22) PCT Filed: Jun. 20, 2016

(86) PCT No.: PCT/US2016/038325
§ 371 (c)(1),
(2) Date: Sep. 28, 2018

(87) PCT Pub. No.: WO2017/222498
PCT Pub. Date: Dec. 28, 2017

(65) Prior Publication Data
US 2020/0301472 A1  Sep. 24, 2020

(51) Int. Cl.
*G06F 1/16* (2006.01)
*G06F 21/88* (2013.01)

(52) U.S. Cl.
CPC ............ *G06F 1/1632* (2013.01); *G06F 21/88* (2013.01)

(58) Field of Classification Search
CPC combination set(s) only.
See application file for complete search history.

(56) References Cited

U.S. PATENT DOCUMENTS

| 5,596,479 A | * | 1/1997 | Campbell | .............. | H01R 13/72 307/150 |
| 5,769,646 A | * | 6/1998 | Cavello | ................. | G06F 1/1656 439/136 |
| 5,924,892 A | * | 7/1999 | Ferracina | ............... | H01R 13/72 439/501 |

(Continued)

FOREIGN PATENT DOCUMENTS

| CN | 2772187 | 4/2006 |
| CN | 201936400 | 8/2011 |

(Continued)

OTHER PUBLICATIONS

Approaches to USB Security, 2016, http://www.computersecurity.com/white_papers/usb-security.htm.

*Primary Examiner* — Lisa Lea-Edmonds
(74) *Attorney, Agent, or Firm* — HP Inc. Patent Department

(57) ABSTRACT

Examples disclosed herein provide a computing device that provides a cable management system. As an example, the computing device includes a tray and a port disposed along an interior perimeter of the tray. As an example, a groove in the tray is to receive a cable that is connectable to the port at a first end of the cable, wherein the cable is to be routed through the groove and a second end of the cable is to emerge external to the computing device. As an example, a lid is to conceal the interior perimeter of the tray, wherein the lid is to secure a connection of the first end of the cable to the port.

13 Claims, 2 Drawing Sheets

(56) References Cited

U.S. PATENT DOCUMENTS

| | | | |
|---|---|---|---|
| 6,017,228 A * | 1/2000 | Verbeek | A47B 21/06 174/493 |
| 6,064,566 A | 5/2000 | Agata et al. | |
| 6,406,327 B1 * | 6/2002 | Soon | G06F 1/181 361/679.02 |
| 6,912,132 B2 | 6/2005 | Riddiford et al. | |
| 6,980,422 B2 | 12/2005 | Bhogal | |
| 7,025,627 B2 * | 4/2006 | Rosenthal | H01R 13/72 439/142 |
| 7,484,991 B1 | 2/2009 | Kelaher | |
| 7,781,676 B2 * | 8/2010 | Martin | H02G 3/32 174/97 |
| 8,002,587 B2 * | 8/2011 | Fleisig | H01R 13/72 439/654 |
| 8,016,611 B2 * | 9/2011 | Fleisig | H01R 27/02 439/501 |
| 8,568,151 B2 | 10/2013 | Cheng | |
| 2007/0088875 A1 * | 4/2007 | Martin | G06F 1/1601 710/62 |
| 2008/0236858 A1 | 10/2008 | Quijano | |
| 2009/0310291 A1 * | 12/2009 | Willburn | A47B 21/06 361/679.22 |
| 2011/0058325 A1 | 3/2011 | Waryck et al. | |
| 2015/0220106 A1 | 8/2015 | Lai et al. | |
| 2018/0032112 A1 * | 2/2018 | Nguyen | A47B 21/06 |

FOREIGN PATENT DOCUMENTS

| | | |
|---|---|---|
| CN | 203871595 | 10/2014 |
| CN | 204179620 | 2/2015 |
| CN | 104717899 | 6/2015 |
| CN | 105637720 | 6/2016 |
| KR | 20-04351252 Y1 | 1/2007 |
| KR | 200435152 | 1/2007 |
| KR | 10-2010-0037758 A | 4/2010 |
| KR | 20100037758 | 4/2010 |
| WO | WO-2010-080954 A2 | 7/2010 |
| WO | WO-2010080954 | 7/2010 |

\* cited by examiner

CABLE CONNECTIONS FOR COMPUTING DEVICES BACKGROUND

BACKGROUND

In computer hardware, a port serves as an interface between the computer and other computers or peripheral devices. Examples of peripheral devices include, but are not limited to, a mouse, keyboard, monitor, webcam, and speakers. A port generally refers to the female part of a connection, to which a plug or cable of a peripheral device connects. Electronically, several conductors where the port and cable contacts connect, provide a method to transfer signals between the devices. Various types of ports are available, to accommodate different capabilities and technologies. As an example, USB ports are used by many peripheral devices.

DETAILED DESCRIPTION

Consumers appreciate ease of use and reliability in their devices. They also appreciate aesthetically pleasing designs. Businesses may, therefore, endeavor to create and provide devices directed toward one or more of these objectives.

Examples disclosed herein provide a computing device with the ability to securely manage cables, for example, of peripheral devices connected to the computing device, in an aesthetic manner. As cable connections, such as USB connections, can generally be easily disconnected, and are not physically secure by themselves to a computing device, various issues may arise. For one, theft of peripheral devices can take place, such as in a conference room, as such peripheral devices may be easily disconnected. Similarly, as the cable connection for a peripheral device may be easily disconnected, for example, without a user's knowledge, the peripheral device may be left in a non-functional state.

By securing cables of the peripheral devices connected to the computing device, as will be further described, the issues described above may be avoided. In addition, the use of various locking mechanisms or screws may be avoided for securing cable connections to the computing device. Furthermore, the cable connections may be secured to the computing device in such a way to make the cable connections appear much cleaner and more integrated to the computing device, contributing to an aesthetically pleasing design. Such a design may be desirable, for example, in executive conference rooms or customer facing presentation areas.

Figure 1A:
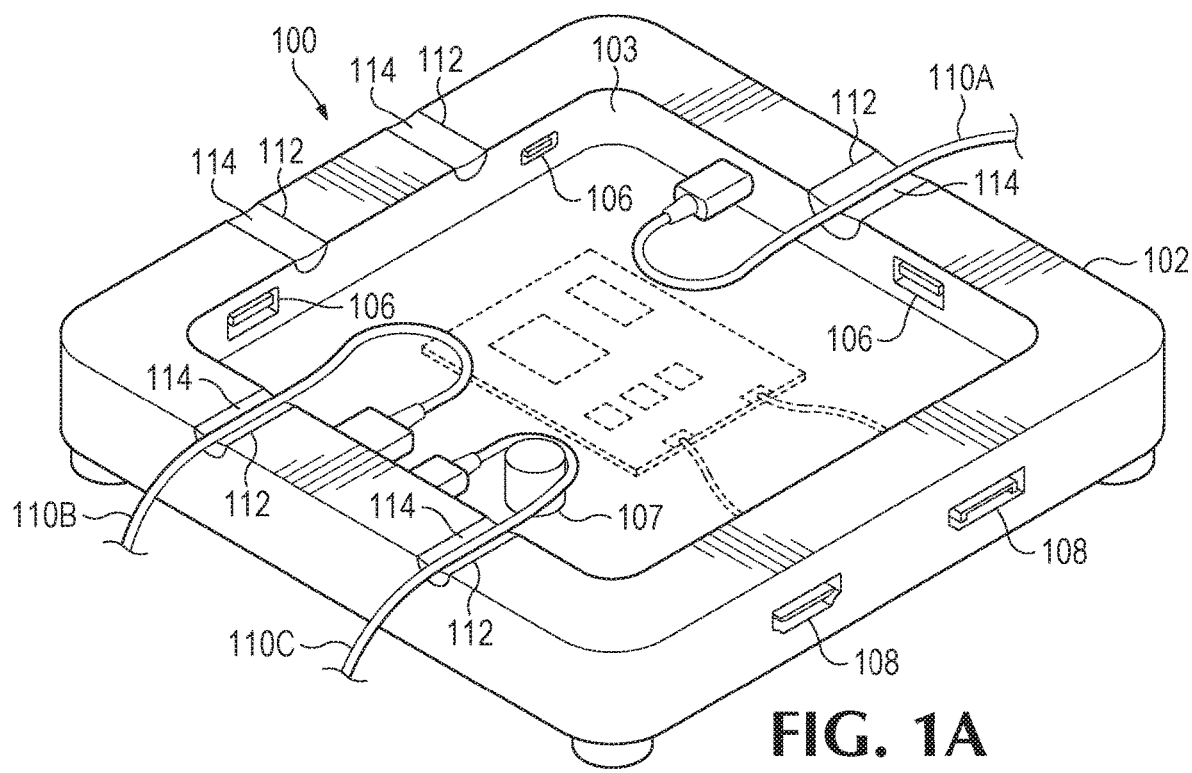
FIGS. 1A-B illustrate a computing device that provides for a secure cable management of devices connected to the computing device via cable connections, according to an example.
Figure 1B:
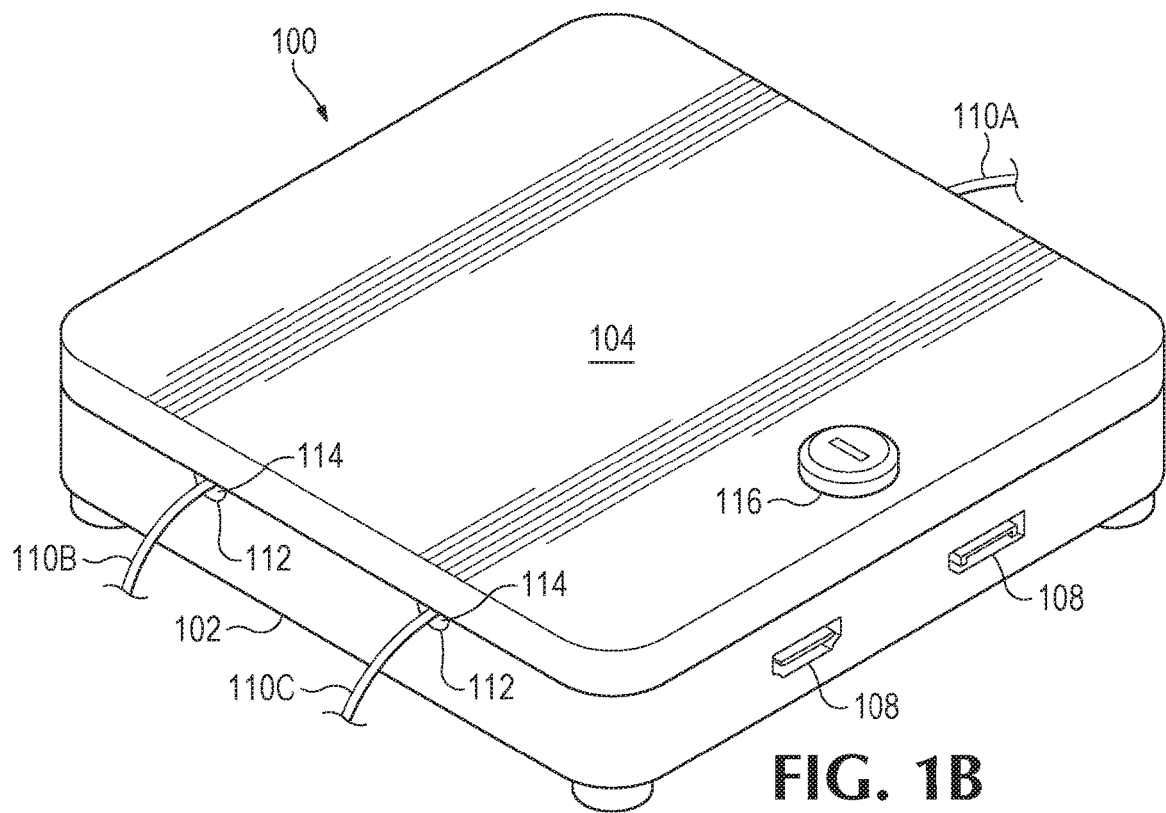

With reference to the figures, FIGS. 1A-B illustrate a computing device 100 that provides a cable management system for securing devices connected to the computing device 100 via cable connections, according to an example. As illustrated, the cable management system includes a tray 102 that, as an example, houses circuitry of the computing device 100 and ports 106 along at least an interior perimeter 103 of the tray 102. In addition, the cable management system includes a lid 104 to conceal and secure the interior perimeter of the tray 102 once cable connections have been made to the ports 106. Although ports 106 are disposed inside the computing device 100, the computing device 100 may also include ports 108 outside the computing device 100 as well, as an example.

As will be further described, by moving ports, for example, from outside the computing device 100 to inside the computing device 100, along with providing the ability to route cable connections to the ports inside the computing device 100, and having the cable connections secured by the lid 104, such cable connections appear much cleaner and more integrated to the computing device 100, contributing to an aesthetically pleasing design. By appearing integrated to the computing device 100, any peripheral devices connected, for example, by the cables 110A-C, as a result, appear to be integrated as part of the core product, the computing device 100. By allowing a user to choose which devices (e.g., peripheral devices) to connect to the internal ports 106, many configurations utilizing the cable management of the computing device 100 are possible, all giving the appearance that each configuration permutation is itself a unique and integrated product. As an example, the tray and lid may be external to the computing device 100, such as a docking station for the computing device 100. As a result, cable connections may be routed and secured internally into the docking station, where a computing device, such as a notebook computer, may be docked.

Referring to FIG. 1A, the tray 102 of the computing device 100 includes grooves 112 to receive cables, such as cables 110A-C, that are connectable to the ports 106 at a first end of the cable (e.g., the ends of the cables 110A-C that are connected to ports 106, as illustrated). As illustrated, the grooves 112 allow for a second end of the cables 110A-C to emerge external to the computing device 100, giving the appearance that the devices associated with the cables 110A-C are integrated with the computing device 100 once the lid 104 is secured to the tray 102. The number of grooves 112 on each side of the computing device 100 may vary. For example, there is only one groove 112 illustrated on the side of the computing device 100 where cable 110A emerges. As a result, all cable connections on that side of the computing device 100 may emerge from that single groove 112. However, there are two grooves 112 on the side of the computing device 100 where cables 110B-C emerge, allowing for each cable to have its own groove.

As an example, the second end of the cables 110A-C emerges external to the computing device 100 at a 180 degrees from the first end of the cables 110A-C connected to the ports 106, as illustrated. Consequently, pulling on one of the cables 110A-C may no longer disconnect it from the connected port 106. Rather, the manner in which the second end of the cables 110A-C emerge external to the computing device 100 may allow for the connection to the ports 106 to remain completely intact and essentially unpluggable. As an example, in an effort for the second end of cable 110C to emerge external to the computing device 100 at a 180 degrees from the first end of the cable 110C connected to an internal port 106, the tray 102 includes a post 107 disposed within the tray 102, wherein the cable 110C is to be routed around the post 107 prior to being routed through the groove 112. By utilizing the post 107, cable crimping or sheering may be prevented. Similar to the varying number of grooves 112 on each side of the computing device 100, the number of posts 107, if available on a particular side of the computing device 100, may vary as well.

As an example, the grooves 112 may include a pliable material 114 to accommodate cables having varying degrees of thicknesses. As a result, the pliable material 114 may seal up the hole created by a groove 112, to only accommodate the space occupied by cables routed through the groove 112. Examples of the pliable material 114 include, but are not limited to, a pliable rubber or plastic.

Referring to FIG. 1B, once cable connections (e.g., cables 110A-C) have been made to the internal ports 106 and are routed to emerge external to the computing device 100 via the grooves 112, a lid 104 may be used to conceal the interior perimeter of the tray 102 and secure the cable connections to the ports 106. As illustrated, by having the cable connections secured by the lid 104, such cable connections appear much cleaner and more integrated to the computing device 100, contributing to an aesthetically pleasing design. As an example, the lid 104 may be attachable to the tray 102 in a variety of ways. For example, the lid 104 may be removable, as illustrated in FIG. 1A, and added back once the cable connections have been made, as illustrated in FIG. 1B. As will be further described below, a lid may also be hinged to the tray 102 (e.g., see FIG. 2). As an example, the tray 102 may be a module of the computing device 100, and another module of the computing device 100 may be stacked or snapped on top of the tray 102, replacing the need for a lid to conceal the interior perimeter of the tray 102 and secure the cable connections to the ports 106.

In order to secure the cable connections made to the ports 106, the lid 104 may be lockable to the tray 102, for example, by a locking mechanism 116. By having a lid 104 that can be secured to the tray 102, all of the cables 110A-C may be made safe from theft, as a person may not be able to pull the cables 110A-C out from the computing device 100 without first unlocking the lid 104.

Figure 2:
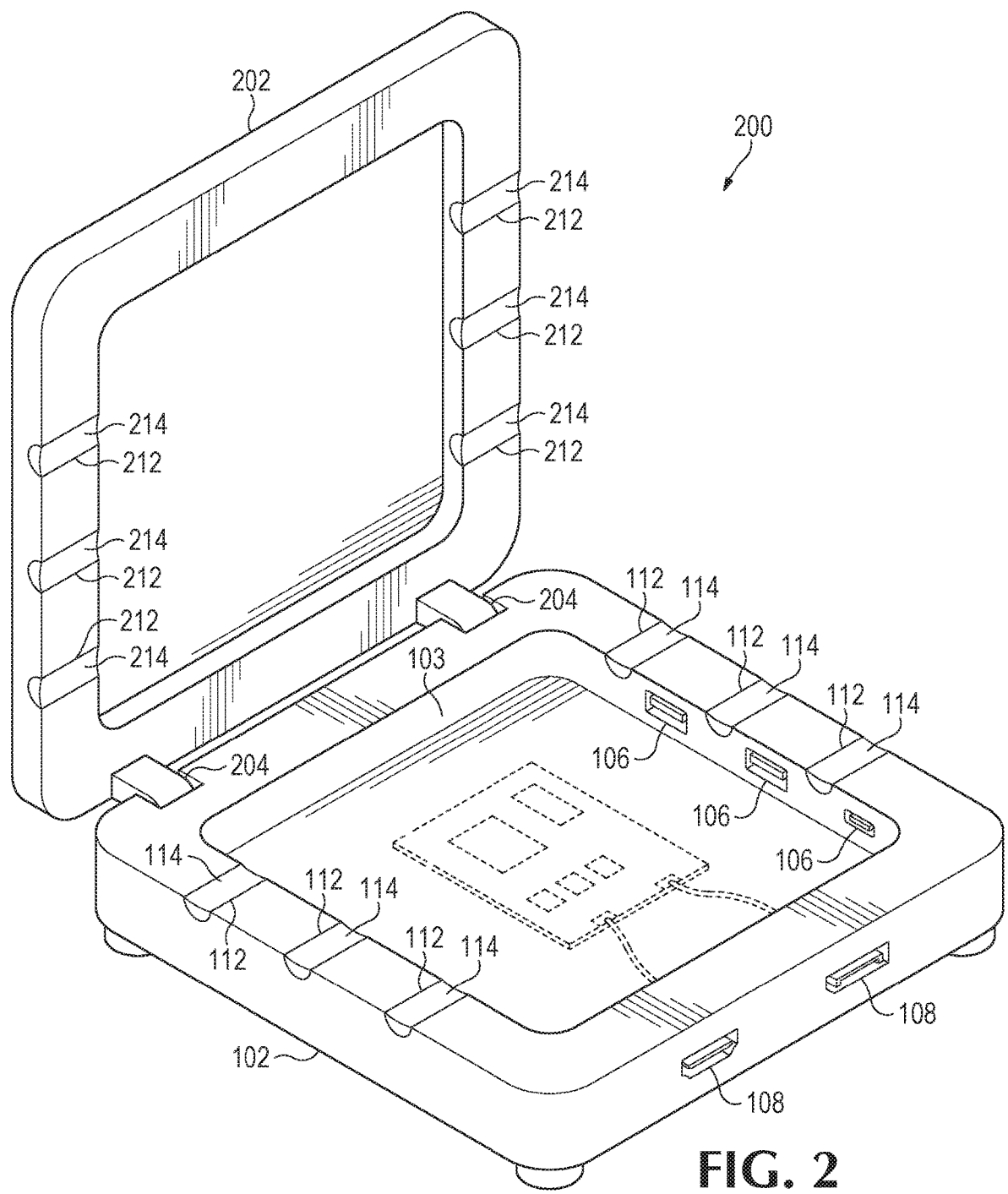
FIG. 2 illustrates a computing device that provides for secure cable management of devices, with a lid that is hinged to a tray, according to an example.

FIG. 2 illustrates a computing device 200 that provides for secure cable management of devices, with a lid 202 that is hinged to the tray 102, according to an example. Components of the computing device 200 may be similar to the components of the computing device 100 of FIGS. 1A-B. However, rather than having a removable lid, computing device 200 may have a lid 202 that is hinged to the tray 102 via hinge mechanisms 204. As an example, the hinge mechanisms 204 may be torqued, in order for the lid 202 to remain at an angle set by the user. For example, the hinge mechanisms 204 may provide a level of resistance to a torque provided when opening or closing the lid 202 with respect to the tray 102.

In addition to the grooves 112 in the tray 102, and corresponding pliable material 114 disposed in the grooves 112, the lid 202 may include grooves 212 to align with the grooves 112 in the tray to accommodate cables emerging external to the computing device 200 (e.g., cables 110A-C from FIGS. 1A-B). The grooves 212 may include pliable material 214 as well, similar to pliable material 114. By providing grooves in both the lid 202 and the tray 102 that align with each other, more clearance may be provided for cables to slip through, connect, and secure devices to the computing device 200. Referring back to FIGS. 1A-B, although grooves 112 are illustrated in the tray 102, grooves may be provided in the lid 104 as well, as described with reference to FIG. 2. Similarly, grooves may not be provided in either the lid 202 or tray 102 of computing device 200 as well.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is clamed is:

1. A computing device comprising:
   a tray
   a port disposed along an interior perimeter of the tray;
   a groove in the tray to receive a cable that is connectable to the port at a first end of the cable, wherein the groove comprises a pliable material to accommodate a cable having varying degrees of thickness, and wherein the cable is to be routed through the groove and a second end of the cable is to emerge external to the computing device; and
   a lid to conceal the interior perimeter of the tray, wherein the lid is to secure a connection of the first end of the cable to the port.

2. The computing, device of claim 1, wherein the tray comprises a post disposed within the tray, wherein the cable is to be routed around the post prior to being routed through the groove.

3. The computing device of claim 1, wherein the lid comprises a groove to align with the groove in the tray, wherein the aligned grooves accommodate the cable emerging external to the computing device.

4. The computing device of claim 1, wherein the second end of the cable is to emerge external to the computing device at a 180 degrees from when the first end of the cable is connected to the port.

5. The computing device of claim 1, wherein the lid is removable.

6. The computing device of claim 1, wherein the lid is hinged to the tray.

7. The computing device of claim 1, wherein the lid is lockable to the tray.

8. A cable management systemfor a computing device, the cable management system comprising:
   a tray:
   a port of the computing device disposed along an interior perimeter of the tray;
   a groove in the tray to receive a cable that is connectable to the port at a first end of the cable, wherein the cable is to be routed through the groove and a second end of the cable is to emerge external to the computing device; and
   a lid hinged to the tray, wherein the lid comprises a grove to align with the groove in the tray, wherein the grooves in the tray and the lid comprise a pliable material to accommodate a cable having varying. degrees of thickness.

9. The cable management system of claim 8, wherein the tray comprises a post disposed within the tray, wherein the cable is to be routed around the post prior to being routed through the groove.

10. The cable management system of claim 8, wherein the lid is lockable to the tray to secure a connection of the first end of the cable to the port.

11. A computing device comprising:
 a tray;
 a port disposed along an interior perimeter of the tray;
 a groove in the tray, wherein the groove comprises a pliable material to accommodate a cable that is connectable to the port at a first end of the cable, wherein the cable is to be routed through the groove and a second end of the cable is to emerge external to the computing device;
 a post disposed within the tray, wherein the cable is to be routed around the post prior to being routed through the groove; and
 a lid to conceal the interior perimeter of the tray, wherein the lid is to secure a connection of the first end of the cable to the port.

12. The computing device of claim 11, wherein the lid comprises a groove to align with the groove in the tray, wherein the aligned grooves accommodate the cable emerging external to the computing device.

13. The computing device of claim 11, wherein the lid is lockable to the tray.

* * * * *